United States Patent
Krol et al.

(10) Patent No.: US 6,834,138 B2
(45) Date of Patent: Dec. 21, 2004

(54) MODULAR OPTICAL SWITCH FABRIC

(75) Inventors: Mark F. Krol, Painted Post, NY (US); Manish Sharma, Princeton, NJ (US)

(73) Assignee: Corning Incorporated, Corning, NY (US)

( * ) Notice: Subject to any disclaimer, the term of this patent is extended or adjusted under 35 U.S.C. 154(b) by 126 days.

(21) Appl. No.: 10/061,766

(22) Filed: Oct. 26, 2001

(65) Prior Publication Data

US 2002/0126502 A1 Sep. 12, 2002

Related U.S. Application Data

(60) Provisional application No. 60/273,788, filed on Mar. 6, 2001.

(51) Int. Cl.[7] .................................................. G02B 6/35
(52) U.S. Cl. ............................................. 385/18; 385/16
(58) Field of Search ........................... 385/15–24, 37, 385/47, 137, 139; 398/45, 50

(56) References Cited

U.S. PATENT DOCUMENTS

| | | | |
|---|---|---|---|
| 4,830,452 A | * | 5/1989 | Oxley .......................... 385/17 |
| 4,901,309 A | | 2/1990 | Turner |
| 6,262,815 B1 | * | 7/2001 | Segawa ........................ 358/494 |
| 6,320,996 B1 | | 11/2001 | Scobey et al. |
| 6,335,992 B1 | * | 1/2002 | Bala et al. ...................... 385/17 |
| 6,344,911 B1 | | 2/2002 | Dailey, Jr. et al. |
| 6,344,912 B1 | | 2/2002 | Hajjar et al. |
| 6,580,849 B2 | * | 6/2003 | Chen et al. .................... 385/18 |
| 2002/0071627 A1 | * | 6/2002 | Smith et al. ................... 385/15 |
| 2002/0085795 A1 | * | 7/2002 | Carr et al. ..................... 385/18 |
| 2002/0122619 A1 | * | 9/2002 | Sandler et al. ................. 385/17 |
| 2002/0164110 A1 | * | 11/2002 | Neukermans et al. .......... 385/18 |
| 2002/0164113 A1 | * | 11/2002 | Rensing et al. ................ 385/18 |

* cited by examiner

*Primary Examiner*—John D. Lee
(74) *Attorney, Agent, or Firm*—Gregory V. Bean (57) ABSTRACT

The present invention is a modular optical switch fabric that includes optical modules that are inserted into an optical chassis by way of plug-in electrical connectors. Each optical module includes a collimator panel and a beam steering panel secured to a frame member. The frame member is configured to position the collimator panel in fixed optical alignment relative to the beam steering panel. The modular optical switch fabric is upgradeable. The optical switch fabric allows users to expand the switch fabric capacity by simply adding switch fabric modules. The optical switch fabric also features modules that can be replaced and repaired without causing interruptions in service.

58 Claims, 4 Drawing Sheets

MODULAR OPTICAL SWITCH FABRIC

This application claims the benefit of provisional application No. 60/273,788, filed Mar. 6, 2001.

BACKGROUND OF THE INVENTION

1. Field of the Invention

The present invention relates generally to optical switches, and particularly to modular optical switch fabrics.

2. Technical Background

Over the past several decades, fiber optic technology has transformed the telecommunications industry. A decade ago, network designs included relatively low-speed transceiver electronics at each end of a communications link. Light signals were switched by being converted into electrical signals. The electrical signals were switched using electronic switches, and converted back again into light signals. The bandwidth of electronic switching equipment is in the Gigahertz range. On the other hand, the bandwidth of single mode fiber is in the Terahertz range. As the demand for bandwidth increased, network designers have sought ways to exploit the bandwidth in the 1550 nm region. Thus began the development of optically transparent switching fabrics.

In one approach, optical designers have considered using planar optical circuit technology to create space division optical switches. In other approaches, designers have considered using movable MEMS mirrors in planar waveguide arrays to create optical switches. Unfortunately, it is very difficult to create large scale N×N optical switch fabrics using these approaches.

In yet another approach being considered, designers are investigating free-space plane-to-plane optical interconnects, referred to as three-dimensional optical cross-connects (3D OXCs). 3D OXCs have the potential to make large scale N×N (e.g., 4000 port×4000 port) switching a reality. However, there are several drawbacks to large scale N×N switching fabrics. Once demand exceeds the capacity of the N×N fabric, the entire fabric must be replaced by a larger fabric. Thus, large replacement costs and service interruptions are incurred. Network managers face the same problem if a portion of the fabric becomes damaged. The entire fabric must be replaced. Finally, designers are having difficulties producing large scale N×N fabrics. The alignment between collimator arrays and beam steering arrays must be fixed over the lifetime of the fabric, and under the operating conditions that the fabric is subject to.

What is needed is a modular optical N×N switching fabric that allows "pay-as-you-grow" upgrades. In other words, a switch fabric is needed that can be expanded by simply adding switching capacity as needed. What is also needed is a modular optical N×N switching fabric that includes modules that can be replaced and repaired without causing interruptions in service. Smaller fabrics are also advantageous in the sense that a module having a unit array size significantly smaller than the aggregate array size can be more easily produced.

SUMMARY OF THE INVENTION

The present invention addresses the needs described above. The present invention provides a modular optical N×N switching fabric that allows "pay-as-you-grow" upgrades. The present invention allows users to expand the switch fabric capacity by simply adding another switch fabric module. The present invention also features a modular optical N×N switching fabric having modules that can be replaced and repaired without causing interruptions in service. The optical modules are advantageous because they include smaller fabrics that are more easily produced than large scale fabrics.

One aspect of the present invention is a modular optical switch fabric that includes an optical chassis. At least one optical module is removably coupled to the optical chassis. The at least one optical module includes a collimator panel and a beam steering panel secured to a frame member. The frame member is configured to position the collimator panel in fixed optical alignment relative to the beam steering panel.

In another aspect, the present invention includes a modular optical switch fabric that includes an optical chassis. A reflective element is attached to the optical chassis. At least one optical module is mechanically coupled to the optical chassis and optically coupled to the mirror. The at least one optical module includes a collimator panel and a beam steering panel secured to a frame member. The frame member is configured to position the collimator panel in fixed optical alignment relative to the beam steering panel.

In another aspect, the present invention includes a modular optical switch fabric that includes an optical chassis. At least one pair of optical modules are coupled to the optical chassis. A first optical module of the pair of optical modules is optically coupled to a second optical module of the pair of optical modules. Each optical module includes a collimator panel and a beam steering panel secured to a frame member. The frame member is configured to position the collimator panel in fixed optical alignment relative to the beam steering panel.

In another aspect, the present invention includes a modular optical switch fabric that includes an optical chassis having a chassis connector. At least one optical module has an optical module connector mating with the chassis connector such that the at least one optical module is removably coupled to the optical chassis. The at least one optical module includes a collimator panel and a beam steering panel secured to a frame member. The frame member is configured to position the collimator panel in fixed optical alignment relative to the beam steering panel.

In another aspect, the present invention includes a modular optical switch fabric that includes an optical chassis having at least one first chassis connector and at least one second chassis connector. A reflective element is attached to the optical chassis. At least one pair of optical modules includes a first optical module and a second optical module, the first optical module has a first optical module connector mating with the at least one first chassis connector, and the second optical module has a second optical module connector mating with the at least one second chassis connector, such that the first optical module is optically coupled to the second optical module via the reflective element. Each optical module includes a collimator panel and a beam steering panel secured to a frame member. The frame member is configured to position the collimator panel in fixed optical alignment relative to the beam steering panel.

In another aspect, the present invention includes an optical module for use in an optical switch fabric. The optical module includes a frame member, a collimator panel secured to the frame member, and a beam steering panel secured to a frame member. The collimator panel is in fixed optical alignment relative to the beam steering panel.

In another aspect, the present invention includes a method for directing a light signal in an optical switch fabric. The optical switch fabric includes an optical chassis. The method includes the step of providing at least one optical module removably coupled to the optical chassis. The at least one optical module includes a collimator element and a beam steering element each secured to a frame member. The frame member is configured to position the collimator element in fixed optical alignment relative to the beam steering element. The light signal is input into the optical module via the collimator element, whereby the light signal is automatically directed onto the beam steering element by virtue of the fixed optical alignment provided by the frame.

In another aspect, the present invention includes a method for directing a light signal in an optical switch fabric. The optical switch fabric includes an optical chassis and a reflective element mounted on the optical chassis. The method includes providing at least one pair of optical modules removably coupled to the optical chassis. A first optical module of the pair of optical modules is optically coupled to a second optical module of the pair of optical modules via the reflective element. The first optical module includes a first collimator element and a first beam steering element secured to a first frame member. The first frame member is configured to position the collimator element in fixed optical alignment relative to the first beam steering element. The second optical module includes a second collimator element and a second beam steering element secured to a second frame member. The second frame member is configured to position the collimator element in fixed optical alignment relative to the beam steering element. The light signal is directed into the first optical module via the first collimator element, whereby the light signal is automatically directed onto the first beam steering element by virtue of the fixed optical alignment provided by the first frame. The light signal is steered from the first beam steering element to the second beam steering element via the reflective element, whereby the light signal is automatically directed into the second collimator element by virtue of the fixed optical alignment provided by the second frame.

In another aspect, the present invention includes a method for maintaining an optical switch fabric being used to direct signal traffic. The signal traffic includes light signals being directed from input fibers to output fibers. The method includes providing an optical chassis having a plurality of plug-in slots. The plug-in slots include at least one repair slot. A plurality of first optical modules are inserted into the plug-in slots of the optical chassis. The at least one repair slot is unused. Each optical module includes a collimator element and a beam steering element each secured to a frame member. The frame member is configured to position the collimator element in fixed optical alignment relative to the beam steering element. A maintenance condition is detected. At least one second optical module is inserted into the at least one repair slot in response to the maintenance condition; whereby the signal traffic is not interrupted.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the modular optical switch fabric of the present invention is shown in FIG. 1, and is designated generally throughout by reference numeral 10.

In accordance with the invention, the present invention for a modular optical switch fabric includes an optical chassis. At least one optical module is removably coupled to the optical chassis. The at least one optical module includes a collimator panel and a beam steering panel secured to a frame member. The frame member is configured to position the collimator panel in fixed optical alignment relative to the beam steering panel. The present invention provides a modular optical N×N switching fabric that allows "pay-as-you-grow" upgrades. The present invention allows users to expand the switch fabric capacity by simply adding another module. The present invention also features a modular optical N×N switching fabric having modules that can be replaced and repaired without causing interruptions in service. The optical modules are advantageous because they include smaller fabrics that are more easily produced than large scale fabrics.

Figure 1:
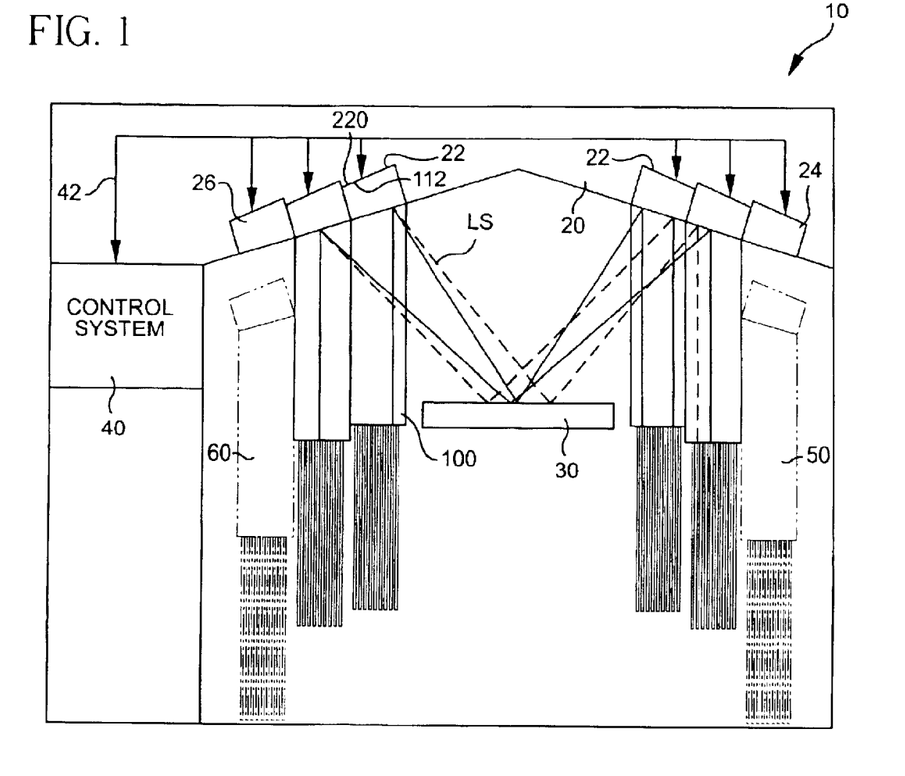
FIG. 1 is a diagrammatic depiction of a folded-Z modular optical switch fabric in accordance with a first embodiment of the present invention.

As embodied herein, and depicted in FIG. 1, a diagrammatic depiction of a folded-Z modular optical switch fabric 10 in accordance with a first embodiment of the present invention is disclosed. Fabric 10 includes optical chassis 20. Optical chassis 20 includes plug-in slots 22 for in-service optical modules 100. As shown in FIG. 1, expansion optical module 50 is being inserted into vacant slot 24 and optical module 60 is being inserted into vacant slot 26 to expand the capacity of switch fabric 10. Reflector 30 is connected to optical chassis 20 in fixed alignment with all in-service optical modules 50, 60 and 100. Optical modules 50, 60 and 100 include male electrical connectors 112 which mate to female electrical connector 220 disposed in slots 22, 24, and 26. Female electrical connector 220 is coupled to control bus 42. Control bus 42 is connected to control system 40. Control system 40 is configured to supply individual control signals to each pixel in switch fabric 10.

It will be apparent to those of ordinary skill in the pertinent art that modifications and variations can be made to control system 40 of the present invention depending on the overall capacity of switch fabric 10. For example, control system 40 may include a 32-bit microprocessor, a RISC processor, or an application specific integrated chip (ASIC). The ASIC may be implemented using a programmable logic array (PLA) device, or by a field programmable gate array (FPGA) device. In another embodiment, control system 40 is implemented using computing resources disposed in the network.

Figure 2:
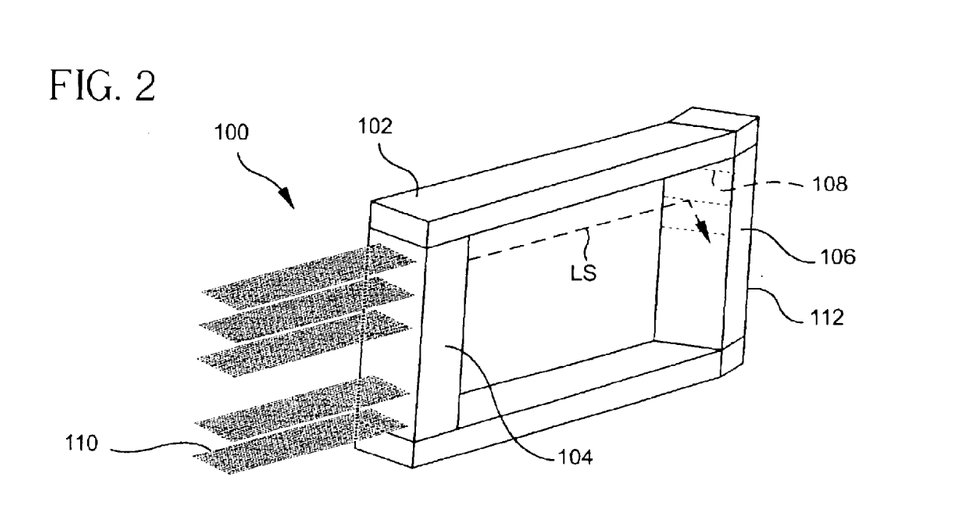
FIG. 2 is a detail view of an optical module used in the switch fabric shown in FIG. 1.

As embodied herein and depicted in FIG. 2, a detail view of optical module 100 used in switch fabric 10 is disclosed. Optical module 100 includes frame 102, which accommodates collimator panel 104, and beam steering panel 106 therebetween. In the embodiment shown in FIG. 2, collimator panel 104 terminates 324 fibers (9 rows×36 fibers) in 324 collimating lenses. Thus, beam steering panel 106 includes 324 steerable pixels corresponding to each fiber collimator. Frame 102 is configured to align each fiber collimator with one pixel. Mechanical frame 102 ensures that alignment between each pixel and its corresponding collimator is fixed, and does not drift over time and operating conditions. This is a critical alignment and must be maintained for the proper operation of the switch fabric 10.

Figure 3:
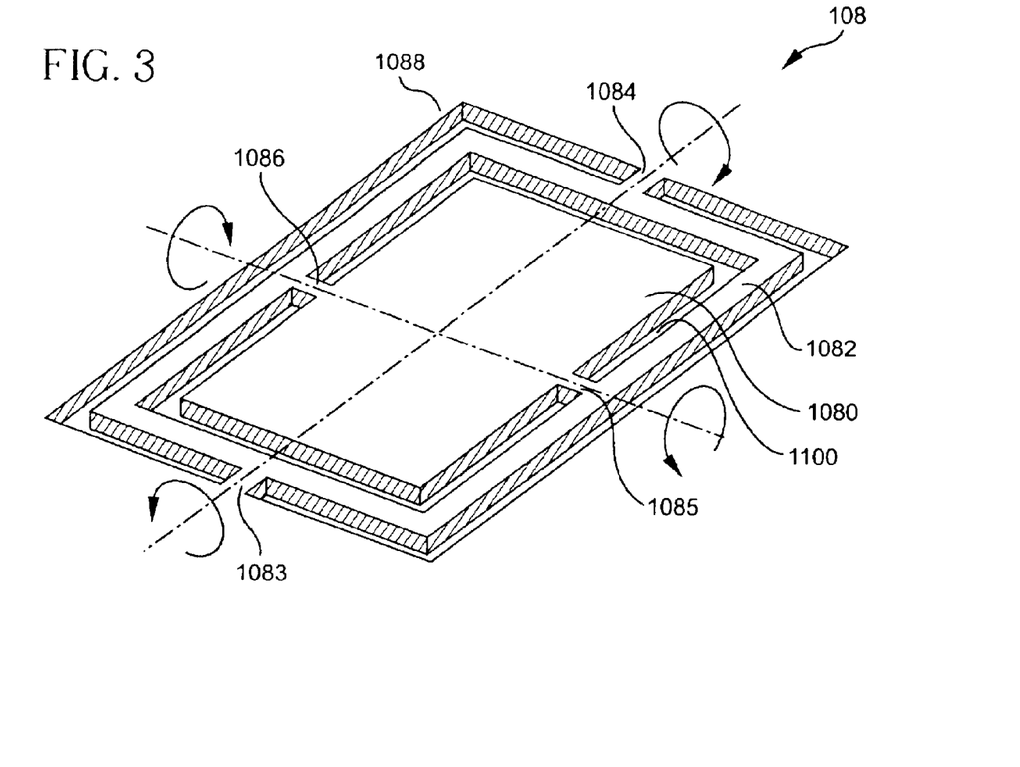
FIG. 3 is a detail view of a gimbaled pixel employed in the optical modules of the present invention.

As embodied herein and depicted in FIG. 3, a detail view of gimbaled pixel assembly 108 employed in accordance with the present invention is disclosed. Assembly 108 includes reflective pixel element 1080. Pixel 1080 is coupled to frame member 1082 via beam 1085 and beam 1086. Beam 1085 and beam 1086 allow pixel element 1086 to rotate around the y-axis. Frame member 1082 is coupled to substrate 1088 via beam 1083 and beam 1084. Beam 1083 and beam 1084 allow frame member 1082 to rotate about the x-axis. Thus, pixel element is steerable with 2-degrees of freedom. As shown in FIG. 3, pixel assembly 108 is suspended over trench 1100. An electrostatic actuator assembly (not shown) is disposed under pixel assembly 108 in trench 1100. The electrostatic actuator assembly is coupled to control system 40 via control bus 42, and connectors 220/112. The actuator assembly includes an electrode disposed under each beam (1083, 1084, 1085, and 1086). To cause a rotation around beam 1083 and beam 1084, the electrodes under beam 1085 and 1086 are actuated by applying an actuation voltage. To cause a rotation around beam 1085 and beam 1086, the electrodes under beam 1083 and beam 1084 are actuated by applying an actuation voltage. The beams twist when they are rotated and become springs that supply a balancing force to the applied electro-static forces. The beams also supply a return force when the applied voltage is reduced.

Figure 4:
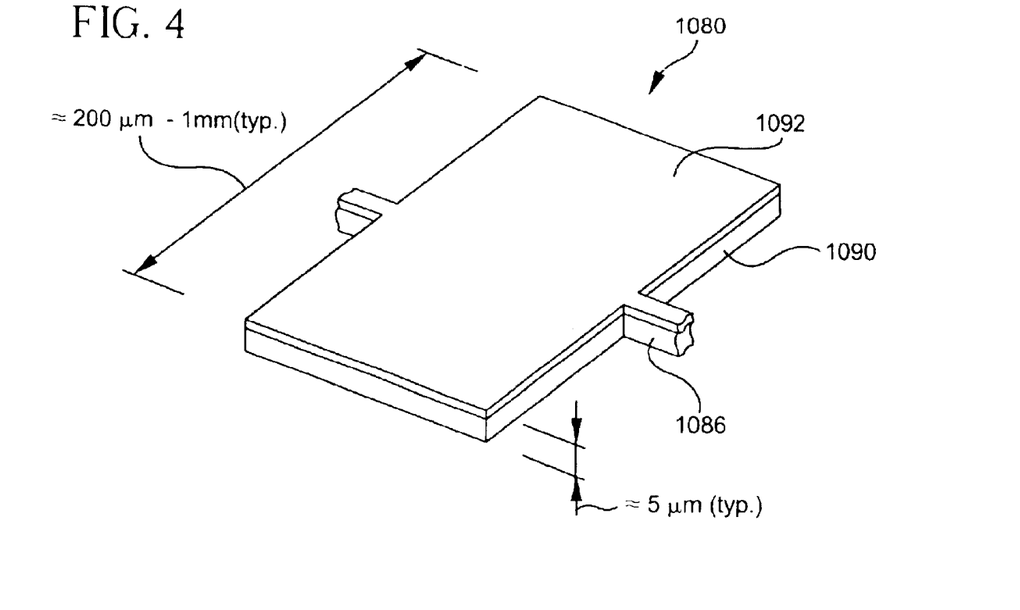
FIG. 4 is a detail view of a pixel mirror element employed in the gimbaled pixel shown in FIG. 3.

As embodied herein and depicted herein and depicted in FIG. 4, a detail view of pixel element 100 is disclosed. Pixel element 1080 includes reflective surface 1092 disposed on substrate 1092. It will be apparent to those of ordinary skill in the pertinent art that modifications and variations can be made to pixel element 1080 of the present invention depending on the beam size of incident light signals. For example, the side dimensions of pixel element 1080 may range between 200 μm to 1 mm. The width of pixel element 1080 is usually below 10 μm, and typically about 5 μm. One of ordinary skill in the art will also recognize that pixel element 1080 can be formed using a number of photolithographic techniques, such as MEMS micro-machining. In one embodiment, substrate 1090 is formed using a silicon material. Reflective layer 1092 is formed by depositing a layer of gold over substrate 1090.

Figure 5:
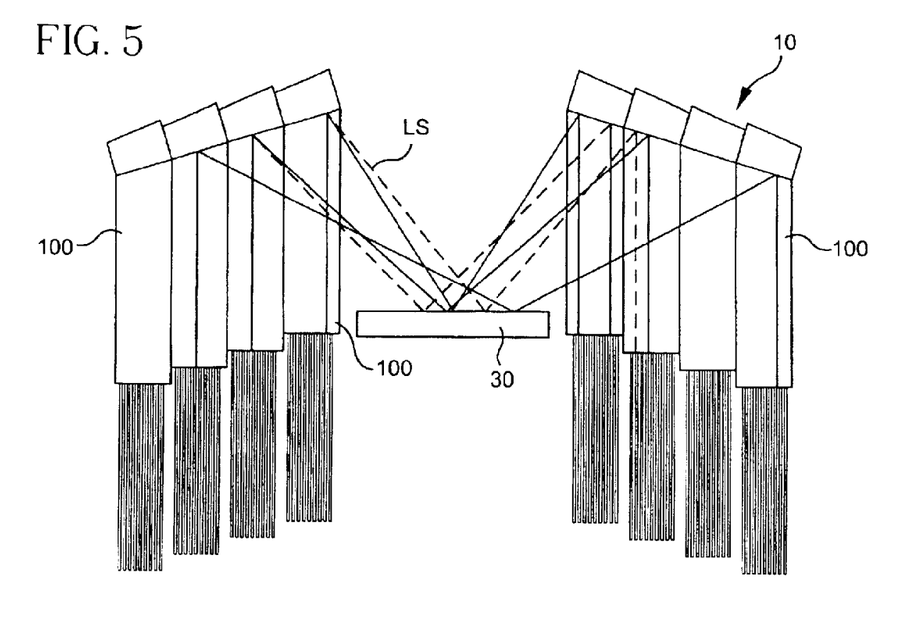
FIG. 5 is a diagrammatic depiction of a fully populated modular optical switch fabric in accordance with a first embodiment of the present invention.

As embodied herein and depicted in FIG. 5, a diagrammatic depiction of a fully populated modular optical switch fabric in accordance with a first embodiment of the present invention is disclosed. In the example shown in FIG. 5, optical modules 100 function as input optical modules and optical modules 100' operate as output optical modules. Of course, control system 40 can accommodate optical modules 100 having both input collimators and output collimators. One of ordinary skill in the art will recognize that it is merely a matter of reconfiguring the control system software. The switch fabric 10 shown in FIG. 5 in a 1296 port switch fabric (324×4).

Figure 6:
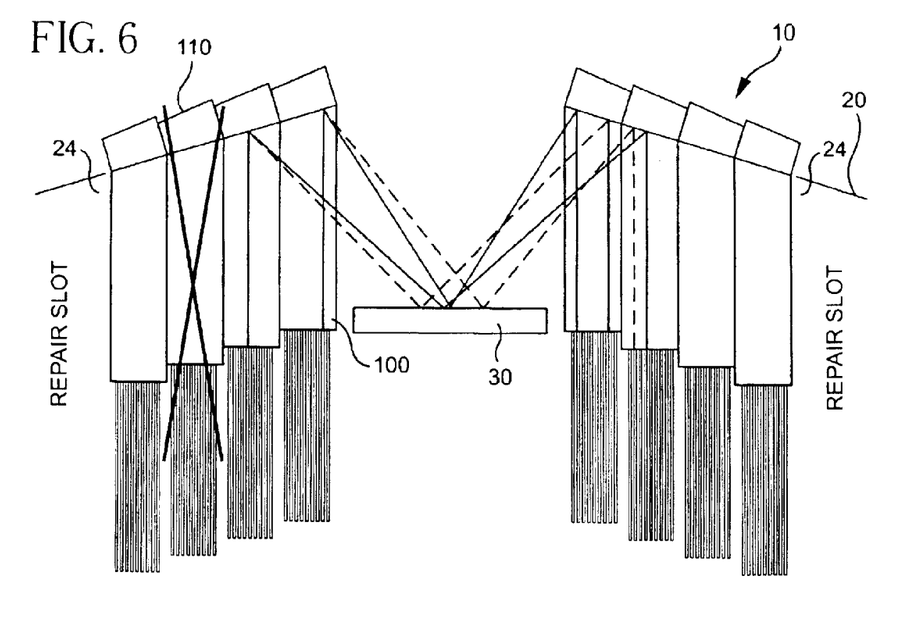
FIG. 6 and FIG. 7 are a diagrammatic depictions of the folded-Z modular optical switch fabric with repair slots.
Figure 7:
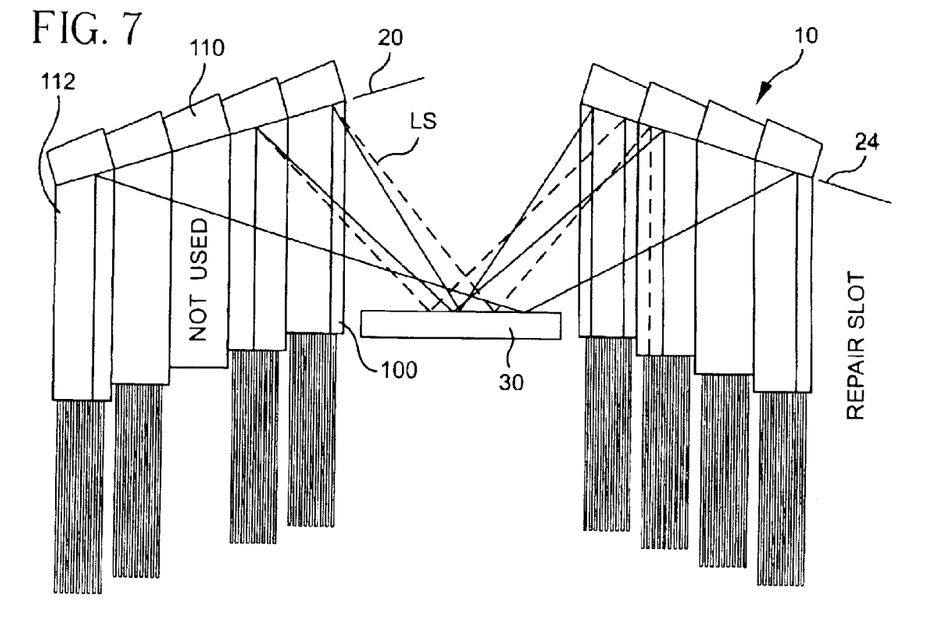

FIG. 6 and FIG. 7 are a variations of the folded-Z modular optical switch fabric shown in FIG. 1 and FIG. 5. In the example depicted in FIG. 6, switch fabric 10 includes repair slots 24. In this example, optical module 110 is subject to a maintenance action. A maintenance action can be necessitated by a failed module 100, or it can also be necessitated by a scheduled maintenance event. As shown in FIG. 7, traffic originating or terminating in module 110 has been re-routed by control system 40 in response to the maintenance action. Subsequently, new optical module 112 is inserted into repair slot 24. Control system employs optical module 112 to propagate traffic within switch fabric 10.

Figure 8:
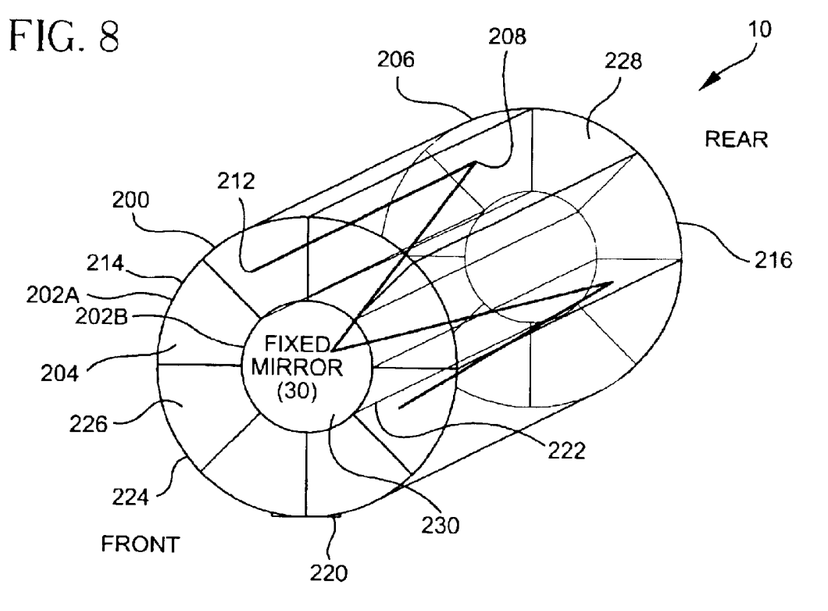
FIG. 8 is a diagrammatic depiction of a cylindrical modular optical switch fabric in accordance with a second embodiment of the present invention.

As embodied herein and depicted in FIG. 8, a diagrammatic depiction of a cylindrical modular optical switch fabric 10 in accordance with a second embodiment of the present invention is disclosed. Cylindrical switch fabric 10 includes optical chassis 220. Chassis 220 includes a central cylindrical core 222. Core 222 includes reflector 30 disposed on base 230 of core 222. Typically, reflector 30 is a convex mirror that facilitates connections between any input and any output port. Chassis 220 also includes a ring portion 224 which is disposed around core portion 222. Ring portion 224 includes annulus 226 which surrounds base 230. The collimators (212) in switch fabric 10 are disposed within annulus 226. The beam steering pixels (208) are disposed within annulus 228. In this second embodiment, optical module 200 is shaped like a prism. The lateral surface area of the cylinder shaped fabric 10 is formed by arcuate frame member 202A. Arcuate frame member 202B is configured to mate with central cylindrical core 222. Collimator panel 204 and beam steering pixel panel 206 are disposed between frame member 202A and frame member 202B. The benefit of the cylindrical shape is that it allows the removal of any optical module 200 from the front, without disrupting traffic in any of the other modules 200.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A modular optical switch fabric comprising:
   an optical chassis; and
   at least one optical module removably coupled to the optical chassis, the at least one optical module including a collimator panel and a beam steering panel secured to a frame member, the frame member being configured to position the collimator panel in fixed optical alignment relative to the beam steering panel.

2. The fabric of claim 1, wherein the optical chassis includes at least one chassis connector to accommodate the at least one optical module.

3. The fabric of claim 2, wherein the at least one optical module includes at least one module connector that mates with the at least one chassis connector.

4. The fabric of claim 2, wherein the at least one optical module receives electrical control signals via the at least one chassis connector.

5. The fabric of claim 1, wherein the optical chassis is formed in a folded Z-shaped configuration having a first wing, a center portion and a second wing.

6. The fabric of claim 5, wherein at least one input optical module is disposed in the first wing, a reflective element is disposed in the center portion, and at least one output optical module is disposed in the second wing.

7. The fabric of claim 1, wherein the optical chassis is substantially in a cylindrical shape.

8. The fabric of claim 7, wherein the cylindrical shape further comprises:
a central cylindrical core portion having a first base and a second base, a reflector being disposed on the first base; and
a ring portion disposed around the central cylindrical core portion, the ring portion including a first annulus disposed around the first base, a second annulus disposed around the second base, and a lateral portion disposed between the first annulus and the second annulus, the ring portion having the at least one optical module disposed therein.

9. The fabric of claim 8, wherein the ring portion includes a plurality of substantially prism shaped segments disposed, each prism shaped segment accommodating an optical module.

10. The fabric of claim 8, wherein the collimator panel is disposed on the first annulus, the beam steering panel is disposed on the second annulus, and the light signal propagates in the lateral portion disposed therebetween.

11. The fabric of claim 8, wherein the reflector includes a substantially convex mirror.

12. The fabric of claim 1, further comprising a mirror element coupled to the optical chassis, the mirror element being in optical communication with the at least one optical module.

13. The fabric of claim 12, wherein the mirror element is substantially convex.

14. The fabric of claim 1, wherein the collimator panel includes at least one collimator in fixed alignment with at least one beam steering pixel disposed on the beam steering panel.

15. The fabric of claim 14, wherein the at least one beam steering pixel includes a MEMS mirror element.

16. The fabric of claim 14, wherein the at least one beam steering pixel includes a gimbaled mirror element having at least two-degrees of beam steering freedom.

17. The fabric of claim 14, wherein the at least one beam steering panel includes a plurality of individually steerable mirror elements.

18. The fabric of claim 17, further comprising a control system coupled to the beam steering panel, the control system being configured to provide a control signal to each of the individually steerable mirror elements.

19. The fabric of claim 17, wherein the plurality of individually steerable mirror elements includes at least 324 individually steerable mirror elements, each individually steerable mirror element being in fixed alignment with a corresponding collimator disposed on the collimator panel.

20. The fabric of claim 1, wherein the beam steering panel includes an electrical plug-in connector that mates with an electrical optical chassis connector.

21. The fabric of claim 1, further comprising a control system for providing the beam steering panel with electrical control signals.

22. A modular optical switch fabric comprising:
an optical chassis;
a reflective element attached to the optical chassis; and at least one optical module mechanically coupled to the optical chassis and optically coupled to the reflective element, the at least one optical module including a collimator panel and a beam steering panel secured to a frame member, the frame member being configured to position the collimator panel. In fixed optical alignment relative to the beam steering panel.

23. A modular optical switch fabric comprising:
an optical chassis; and
at least one pair of optical modules coupled to the optical chassis, a first optical module of the pair of optical modules being optically coupled to a second optical module of the pair of optical modules, each optical module including a collimator panel and a beam steering panel secured to a frame member, the frame member being configured to position the collimator panel in fixed optical alignment relative to the beam steering panel.

24. The fabric of claim 23, further comprising a mirror element coupled to the optical chassis, the mirror element providing optical communication between the first optical module and the second optical module.

25. The fabric of claim 23, wherein the first optical module is configured to direct at least one light signal into the switch fabric and the second optical module is configured to direct the at least one light signal out of the switch fabric.

26. The fabric of claim 23, wherein the optical chassis is formed in a folded Z-shaped configuration having a first wing, a center portion and a second wing.

27. The fabric of claim 26, wherein the first optical module is disposed in the first wing, a reflective element is disposed in the center portion, and the second optical module is disposed in the second wing.

28. The fabric of claim 23, wherein the optical chassis is substantially in a cylindrical shape.

29. The fabric of claim 28, wherein the cylindrical shape further comprises:
a central cylindrical core portion having a first base and a second base, a reflector being disposed on the first base; and
a ring portion disposed around the central cylindrical core portion, the ring portion including a first annulus disposed around the first base, a second annulus disposed around the second base, and a lateral portion disposed between the first annulus and the second annulus, the ring portion having the at least one pair of optical module disposed therein.

30. The fabric of claim 29, wherein the ring portion includes a plurality of substantially prism shaped segments disposed, each prism shaped segment accommodating an optical module.

31. The fabric of claim 29, wherein collimator panels are disposed on the first annulus, beam steering panels are disposed on the second annulus, and the light signal propagates in the lateral portion disposed therebetween.

32. The fabric of claim 29, wherein the reflector includes a substantially convex mirror.

33. The fabric of claim 28, wherein each collimator panel includes at least one collimator in fixed alignment with at least one beam steering pixel disposed on a corresponding beam steering panel.

34. The fabric of claim 33, wherein the at least one beam steering pixel includes a, MEMS mirror element.

35. The fabric of claim 33, wherein the at least one beam steering pixel includes a gimbaled mirror element having at least two-degrees of beam steering freedom.

36. The fabric of claim 33, wherein the at least one beam steering panel includes a plurality of individually steerable mirror elements.

37. The fabric of claim 36, further comprising a control system coupled to the beam steering panel, the control system being configured to provide a control signal to each of the individually steerable mirror elements.

38. The fabric of claim 36, wherein the plurality of individually steerable mirror elements includes at least 324 individually steerable mirror elements, each individually steerable mirror element being in fixed alignment with a corresponding collimator disposed on the collimator panel.

39. The fabric of claim 23, wherein the beam steering panel includes an electrical plug-in connector that mates with an electrical optical chassis connector.

40. The fabric of claim 23, further comprising a control system for providing the beam steering panel with electrical control signals.

41. A modular optical switch fabric comprising:
an optical chassis having a chassis connector; and
at least one optical module having an optical module connector mating with the chassis connector such that the at least one optical module is removably coupled to the optical chassis, the at least one optical module including a collimator panel and a beam steering panel secured to a frame member, the frame member being configured to position the collimator panel in fixed optical alignment relative to the beam steering panel.

42. A modular optical switch fabric comprising:
an optical chassis having at least one first chassis connector and at least one second chassis connector;
a reflective element attached to the optical chassis; and
at least one pair of optical modules including a first optical module and a second optical module, the first optical module having a first optical module connector mating with the at least one first chassis connector and the second optical module having a second optical module connector mating with the at least one second chassis connector such that the first optical module is optically coupled to the second optical module via the reflective element, each optical module including a collimator panel and a beam steering panel secured to a frame member, the frame member being configured to position the collimator panel in fixed optical alignment relative to the beam steering panel.

43. An optical module for use in an optical switch fabric, the optical module comprising:
a frame member;
a collimator panel secured to the frame member;
a beam steering panel secured to a frame member, whereby the collimator panel is in fixed optical alignment relative to the beam steering panel; and
a module connection mechanism coupled to the frame member, the module connection mechanism being configured to mate with an optical chassis to thereby form the optical switch fabric.

44. The optical module of claim 43, wherein the collimator panel includes at least one collimator in fixed alignment with at least one beam steering pixel disposed on a corresponding beam steering panel.

45. The optical module of claim 44, wherein the at least one beam steering pixel includes a MEMS mirror element.

46. The optical module of claim 44, wherein the at least one beam steering pixel includes a gimbaled mirror element having at least two-degrees of beam steering freedom.

47. The optical module of claim 44, wherein the beam steering panel includes a plurality of individually steerable mirror elements.

48. The optical module of claim 47, wherein the plurality of individually steerable mirror elements includes at least 324 individually steerable mirror elements, each individually steerable mirror element being in fixed alignment with a corresponding collimator disposed on the collimator panel.

49. A method for directing a light signal in an optical switch fabric, the optical switch fabric including an optical chassis, the method comprising:
providing at least one optical module removably coupled to the optical chassis, the at least one optical module including a collimator element and a beam steering element each secured to a frame member, the frame member being configured to position the collimator element in fixed optical alignment relative to the beam steering element; and
inputting the light signal into the optical module via the collimator element, whereby the light signal is automatically directed onto the beam steering element by virtue of the fixed optical alignment provided by the frame.

50. The method of claim 49, wherein the step of providing includes providing a pair of optical modules, the pair of optical modules including a first optical module and a second optical module.

51. The method of claim 50, further comprising the step of directing the light signal from a first beam steering element on the first optical module to a second beam steering element on the second optical module.

52. The method of claim 51, wherein the step of directing the light signal from a first beam steering element includes reflecting the light signal off of a mirror element.

53. A method for directing a light signal in an optical switch fabric, the optical switch fabric including an optical chassis and a reflective element mounted on the optical chassis, the method comprising:
providing at least one pair of optical modules removably coupled to the optical chassis, a first optical module of the pair of optical modules being optically coupled to a second optical module of the pair of optical modules via the reflective element, the first optical module including a first collimator element and a first beam steering element secured to a first frame member, the first frame member being configured to position the collimator element in fixed optical alignment relative to the first beam steering element, the second optical module including a second collimator element and a second beam steering element secured to a second frame member, the second frame member being configured to position the collimator element in fixed optical alignment relative to the beam steering element;
directing the light signal into the first optical module via the first collimator element, whereby the light signal is automatically directed onto the first beam steering element by virtue of the fixed optical alignment provided by the first frame, and
steering the light signal from the first beam steering element to the second beam steering element via the reflective element, whereby the light signal is automatically directed into the second collimator element by virtue of the fixed optical alignment provided by the second frame.

54. A method for maintaining an optical switch fabric being used to direct signal traffic, the signal traffic including light signals being directed from input fibers to output fibers, the method comprising:

providing an optical chassis having a plurality of plug-in slots, the plug-in slots including at least one repair slot;

inserting a plurality of first optical modules into the plug-in slots of the optical chassis, the at least one repair slot being unused; each optical module including a collimator element and a beam steering element each secured to a frame member, the frame member being configured to position the collimator element in fixed optical alignment relative to the beam steering element;

detecting a maintenance condition; and inserting at least one second optical module into the at least one repair slot in response to the maintenance condition; whereby the signal traffic is not interrupted.

55. The method of claim 54, wherein the maintenance condition includes the detection of a failed optical module.

56. The method of claim 55, further comprising the step of removing the failed optical module.

57. The method of claim 54, wherein the maintenance condition includes a scheduled maintenance action.

58. The method of claim 56, wherein the maintenance condition includes adding at least one new optical module to thereby increase optical switch fabric capacity.

* * * * *